(12) United States Patent
Yao

(10) Patent No.: US 8,225,655 B2
(45) Date of Patent: Jul. 24, 2012

(54) ALTITUDE SENSING SYSTEMS FOR FLYING HEIGHT ADJUSTMENT

(75) Inventor: MingGao Yao, Dongguan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 1252 days.

(21) Appl. No.: 12/000,833

(22) Filed: Dec. 18, 2007

(65) Prior Publication Data
US 2009/0154007 A1   Jun. 18, 2009

(51) Int. Cl.
*G01L 7/20*   (2006.01)
(52) U.S. Cl. ............. 73/384; 73/702; 360/75; 360/97.2; 360/98.01
(58) Field of Classification Search .................... 73/384, 73/702, 704; 360/97.02
See application file for complete search history.

(56) References Cited

U.S. PATENT DOCUMENTS

| 6,671,131 | B2 | 12/2003 | Kasajima et al. |
| 6,700,749 | B2 | 3/2004 | Shiraishi et al. |
| 2003/0168935 | A1 | 9/2003 | Ogawa et al. |
| 2005/0021247 | A1* | 1/2005 | Liu et al. .................... 702/42 |
| 2007/0138909 | A1* | 6/2007 | Mortet et al. ................ 310/318 |
| 2007/0169553 | A1* | 7/2007 | Mutharasan et al. .......... 73/579 |

FOREIGN PATENT DOCUMENTS

| CN | 1707679 | 12/2005 |
| JP | 2002-133803 | 5/2002 |
| JP | 2005-093055 | 4/2005 |

* cited by examiner

*Primary Examiner* — Lisa Caputo
*Assistant Examiner* — Roger Hernandez-Prewitt
(74) *Attorney, Agent, or Firm* — Nixon & Vanderhye PC

(57) ABSTRACT

An altitude sensor includes a support frame and a sensor unit mounted in the support frame. The support frame has an upper shield and a lower shield. The sensor unit includes a beam and a damper. The damper is configured to move up and down in response to the air flow, which drives the beam to move up and down accordingly. Distances from the damper to the upper shield and the lower shield are less than those from the beam to upper shield and the lower shield. The altitude sensor possesses super specific properties such as unlimited sensitivity to flying height because of no size constraints and unchanged sensitivity under a changing environment, a self-protective mechanism to resist deformation in case of an accident, easy manufacture process as well as low production cost. The present invention also discloses an altitude sensor for use in a disk drive device and a disk drive device with the altitude sensor.

23 Claims, 13 Drawing Sheets

701

701

ALTITUDE SENSING SYSTEMS FOR FLYING HEIGHT ADJUSTMENT

FIELD OF THE INVENTION

The present invention herein relates to information recording disk drive devices and, more particularly, to altitude sensing systems for flying height adjustment in disk drive devices.

BACKGROUND OF THE INVENTION

One known type of information storage device is a disk drive device that uses magnetic media to store data and a movable read/write head that is positioned over the media to selectively read from or write to the disk.

Consumers are constantly desiring greater storage capacity for such disk drive devices, as well as faster and more accurate reading and writing operations. Thus, disk drive manufacturers have continued to develop higher capacity disk drives by, for example, increasing the density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult using known technology to quickly and accurately position the read/write head over the desired information tracks on the storage media. Thus, disk drive manufacturers are constantly seeking ways to improve the positional control of the read/write head in order to take advantage of the continual increases in track density.

One approach that has been effectively used by disk drive manufacturers to improve the positional control of read/write heads for higher density disks is to employ a secondary actuator, known as a micro-actuator, which works in conjunction with a primary actuator to enable quick and accurate positional control for the read/write head. Disk drives that incorporate micro-actuators are known as dual-stage actuator systems.

Various dual-stage actuator systems have been developed in the past for the purpose of increasing the access speed and fine tuning the position of the read/write head over the desired tracks on high density storage media. Such dual-stage actuator systems typically include a primary voice-coil motor (VCM) actuator and a secondary micro-actuator, such as a PZT element micro-actuator. The VCM actuator is controlled by a servo control system that rotates the actuator arm that supports the read/write head to position the read/write head over the desired information track on the storage media. The PZT element micro-actuator is used in conjunction with the VCM actuator for the purpose of increasing the positioning access speed and fine tuning the exact position of the read/write head over the desired track. Thus, the VCM actuator makes larger adjustments to the position of the read/write head, while the PZT element micro-actuator makes smaller adjustments that fine tune the position of the read/write head relative to the storage media. In conjunction, the VCM actuator and the PZT element micro-actuator enable information to be efficiently and accurately written to and read from high density storage media.

One known type of micro-actuator incorporates PZT elements for causing fine positional adjustments of the read/write head. Such PZT micro-actuators include associated electronics that are operable to excite the PZT elements on the micro-actuator to selectively cause expansion and/or contraction thereof. The PZT micro-actuator is configured such that expansion and/or contraction of the PZT elements causes movement of the micro-actuator which, in turn, causes movement of the read/write head. This movement is used to make faster and finer adjustments to the position of the read/write head, as compared to a disk drive unit that uses only a VCM actuator. Exemplary PZT micro-actuators are disclosed in, for example, JP 2002-133803; U.S. Pat. Nos. 6,671,131 and 6,700,749; and U.S. Publication No. 2003/0168935, the contents of each of which are incorporated herein by reference.

FIG. 1a illustrates a conventional disk drive unit and show a magnetic disk 101 mounted on a spindle motor 102 for spinning the disk 101. A voice coil motor arm 104 carries a head gimbal assembly (HGA) that includes a micro-actuator 105 with a slider incorporating a read/write head 103. A voice-coil motor (VCM) is provided for controlling the motion of the motor arm 104 and, in turn, controlling the slider to move from track to track across the surface of the disk 101, thereby enabling the read/write head 103 to read data from or write data to the disk 101.

Because of the inherent tolerances (e.g., dynamic play) of the VCM and the head suspension assembly, the slider cannot achieve quick and fine position control, which adversely impacts the ability of the read/write head to accurately read data from and write data to the disk when only a servo motor system is used. As a result, a PZT micro-actuator 105, as described above, is provided in order to improve the positional control of the slider and the read/write head 103. More particularly, the PZT micro-actuator 105 corrects the displacement of the slider on a much smaller scale, as compared to the VCM, in order to compensate for the resonance tolerance of the VCM and/or head suspension assembly. The micro-actuator enables, for example, the use of a smaller recording track pitch, and can increase the "tracks-per-inch" (TPI) value for the disk drive unit, as well as provide an advantageous reduction in the head seeking and settling time. Thus, the PZT micro-actuator 105 enables the disk drive device to have a significant increase in the surface recording density of the information storage disks used therein.

These refinements have focused on finely tuned horizontal displacement to accommodate the rapid increase in disk drive capacity. Similarly, rapidly increasing the capacity also requires that the height at which the head flies over the magnetic media be controlled with more and more sensitivity. Accordingly, an acceleration sensor and/or pressure sensor has been provided between the suspension dimple and the flexure of an HGA as disclosed, for example, in JP 2005-093055, the entire contents of which are incorporated herein by reference. When the head flying height changes, the acceleration sensor and/or the PZT sensor will detect the pressure between the dimple and the flexure and generate an electrical potential voltage in response thereto. From this signal, the servo will adjust and/or compensate for the changes in flying height.

FIG. 1b is a sensor for detecting flying height in the prior art. An acceleration sensor or pressure sensor 115 is a laminated structure, located between the dimple 112 formed on the load beam 111 and the slider 100. The sensor 115 includes a piezoelectric crystal layer 119. The first and second conductor layers 118 and 120 are formed on both sides of the piezoelectric crystal layer 119. A first insulator layer 117 is disposed between the first conductor layer 118 and the metal layer 116 (which may contact dimple 112). A second insulator layer 121 may be disposed between the second conductor layer 120 and the slider 100. When head-disk interface (HDI) occurs, the acceleration sensor or pressure sensor 115 will be pressed, generating an electrical potential voltage of several millivolts. Based on this signal, the servo will adjust and/or compensate the flying height.

Unfortunately, this technique suffers several drawbacks. For example, because of size constraints, the sensitivity to flying height changes is limited. Also, the sensitivity frequently changes when an environmental condition changes. Thus, for example, as the altitude changes, the sensitivity of the altitude measurement also changes, which challenges the servo control system to account both for the change in height and the change in height measurement sensitivity. Moreover, prior techniques provide a PZT element between the suspension flexure and the dimple, which may make it easy to damage the PZT element during dimple and flexure interference (e.g. when a shock or vibration occurs, etc.). This interference may generate fragments or particles, which may, in turn, contaminate the head-disk interface and affect the read and write functions of the head. In the long-term, these drawbacks result in reliability concerns. Additionally, the manufacturing process is difficult and costly.

Thus it will be appreciated that there is a need in the art for altitude sensing systems for flying height adjustment in disk drive devices.

SUMMARY OF THE INVENTION

Accordingly, an object of the present invention is to provide an altitude sensor which is configured to detect an air flow generated by a component of a system. The altitude sensor possesses super specific properties such as unlimited sensitivity to flying height because of no size constraints, unchanged sensitivity under a changing environment, a self-protective mechanism to resist deformation in case of an accident, easy manufacture process, and low production cost.

A further object of the present invention is to provide an altitude sensor for use in a disk drive device to adjust flying height of a slider embedded in the disk drive device. The altitude sensor possesses super specific properties such as unlimited sensitivity to flying height because of no size constraints, unchanged sensitivity under a changing environment, a selfprotective mechanism to resist deformation in case of an accident, easy manufacture process, and low production cost.

Another object of the present invention is to provide a disk drive device with an altitude sensor to adjust flying height of a slider embedded in the disk drive device. The altitude sensor possesses super specific properties such as unlimited sensitivity to flying height because of no size constraints, unchanged sensitivity under a changing environment, a self-protective mechanism to resist deformation in case of an accident, easy manufacture process, and low production cost. The disk drive device with such altitude sensor enhances reliability of operation.

To achieve the above-mentioned objects, the present invention provides an altitude sensor. The altitude sensor is configured to detect an air flow generated by a component of a system. The altitude comprises a support frame and a sensor unit mounted in the support frame. The support frame has an upper shield and a lower shield opposite the upper shield. The sensor unit comprises a beam cantilevered horizontally in the support frame, a damper attached to a free end of the beam, at least one PZT layer formed on a surface of the beam, and at least one connection pad operably coupled to the at least one PZT layer. The damper is configured to move up and down in response to the air flow, which drives the beam to move up and down accordingly. The at least one PZT layer is configured to generate a voltage corresponding to a movement of the beam. The at least one connection pad is suitable for outputting the voltage. Distances from the damper to the upper shield and the lower shield are less than those from the beam to the upper shield and the lower shield, respectively. The air flow is related to altitude.

As an embodiment of the present invention, the support frame further comprises two side shields, and the two side shields respectively connect corresponding end portions of the upper shield and the lower shield. One of the two side shields has a notch formed therein, and an end of the beam opposite the free end is inserted into the notch.

Preferably, the damper is bonded to the beam by adhesive. Alternatively, the beam is integrally formed with the damper.

Preferably, the beam comprises a substrate layer formed from a ceramic and/or a metal, and the at least one PZT layer is formed on the substrate layer.

An altitude sensor for use in a disk drive device comprises a support frame and a sensor unit mounted in the support frame. The support frame has an upper shield and a lower shield opposite the upper shield. The sensor unit comprises a beam cantilevered horizontally in the support frame, a damper attached to a free end of the beam, at least one PZT layer formed on a surface of the beam, and at least one connection pad operably coupled to the at least one PZT layer. The damper is configured to move up and down in response to an air flow generated by a rotating disk, which drives the beam to move up and down accordingly. The at least one PZT layer is configured to generate a voltage corresponding to a movement of the beam. The at least one connection pad is suitable for outputting the voltage. Distances from the damper to the upper shield and the lower shield are less than those from the beam to the upper shield and the lower shield, respectively.

A disk drive device comprises a head gimbal assembly, a drive arm, a disk, a spindle motor and an altitude sensor. The head gimbal assembly includes a slider formed thereon. The drive arm is connected to the head gimbal assembly. The spindle motor is operable to spin the disk. The disk causes an air flow when spun. The altitude sensor is for adjusting flying height of the slider. The altitude sensor includes a support frame and a sensor unit mounted in the support frame. The support frame has an upper shield and a lower shield opposite the upper shield. The sensor unit comprises a beam cantilevered horizontally in the support frame, a damper attached to a free end of the beam, at least one PZT layer formed on a surface of the beam, and at least one connection pad operably coupled to the at least one PZT layer. The damper is configured to move up and down in response to the air flow, which drives the beam to move up and down accordingly. The at least one PZT layer is configured to generate a voltage corresponding to a movement of the beam. The at least one connection pad is suitable for outputting the voltage. Distances from the damper to the upper shield and the lower shield are less than those from the beam to the upper shield and the lower shield, respectively.

Preferably, the disk drive device further comprises a processor configured to determine a flying height of the slider over the disk appropriate at a given altitude, a dynamic flying height of the slider over the disk, and an adjustment amount corresponding to the difference between the flying height and the dynamic flying height. Also preferably, the processor calculates the altitude according to a formula, the formula being $y=-2.29x+115$, wherein y is the sensor output in millivolts and x is the altitude in thousands of feet.

As an embodiment of the present invention, the altitude sensor is located proximate to the disk.

As another embodiment of the present invention, the altitude sensor is located on a connector of the disk drive device.

As still another embodiment of the present invention, the altitude sensor is located on a top surface of the drive arm.

As yet another embodiment of the present invention, the altitude sensor is located on a side surface of the drive arm.

As another embodiment of the present invention, the altitude sensor is located on a middle region of traces of the head gimbal assembly.

As still another embodiment of the present invention, the altitude sensor is located under the slider.

As yet another embodiment of the present invention, the altitude sensor is located near a leading edge of the slider.

In comparison with the prior art, besides easy manufacture process and low production cost, the altitude sensor of the present invention further has several advantages. Firstly, as the altitude sensor employs a damper to move in response to the air flow, the altitude sensor could well sense various forces generated by the air flow, thereby enabling to exactly adjust the flying height of the slider. Secondly, the altitude sensor has not size constraints, thus sensitivity to flying height is unlimited. Thirdly, the sensitivity does not change when an environmental condition changes. That is, when the altitude changes, the sensitivity of altitude measurement may not change. Moreover, the damper works as a limiter to prevent the beam from deforming too much, thus successfully protecting PZT elements on the beam from damage in accident, such as during dimple and flexure interference or in case of a shock or vibration. Therefore, no fragments or particles will be generated, and thus the head-disk interface would not contaminated or impaired, thereby the head read and write functions could be soundly achieved. In fact, the altitude sensor of the present invention enhances reliability of the disk drive unit due to the capability of flying height adjustment.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 7b is a detailed view of the drive arm of FIG. 7a;

DETAILED DESCRIPTION OF ILLUSTRATED EMBODIMENTS

Figure 1A:
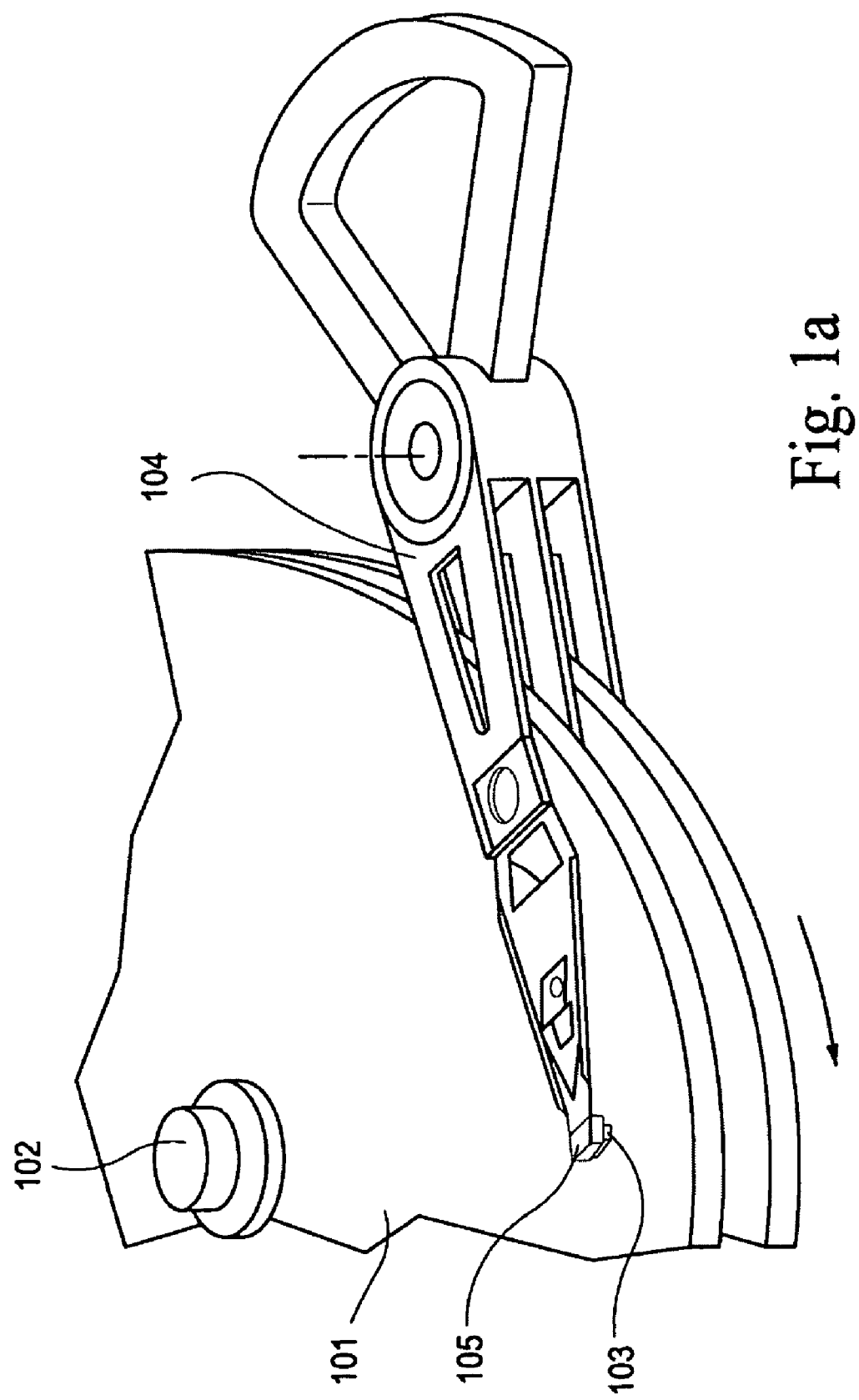
FIG. 1a is a partial perspective view of a conventional disk drive unit.
Figure 1B:
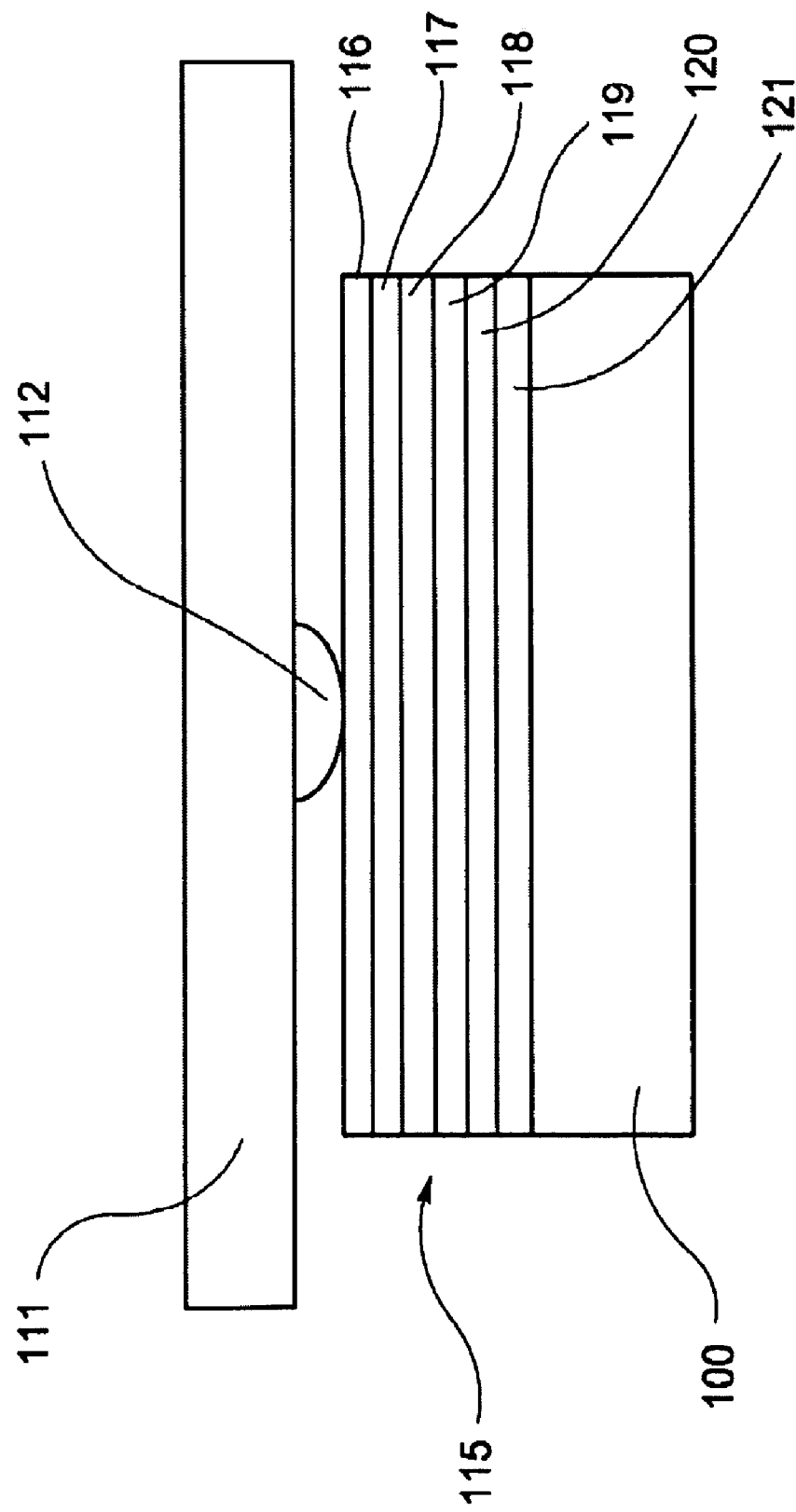
FIG. 1b is a sensor for detecting flying height in the prior art.

Various preferred embodiments of the invention will now be described with reference to the figures, wherein like reference numerals designate similar parts throughout the various views. The present invention provides a disk drive device with an altitude sensor to adjust flying height of a slider embedded in the disk drive device. The altitude sensor possesses super specific properties such as unlimited sensitivity to flying height because of no size constraints and unchanged sensitivity under a changing environment, a selfprotective mechanism to resist deformation in case of an accident, easy manufacture process as well as low production cost. Thus the disk drive device with such altitude sensor enhances reliability of operation.

Figure 2A:
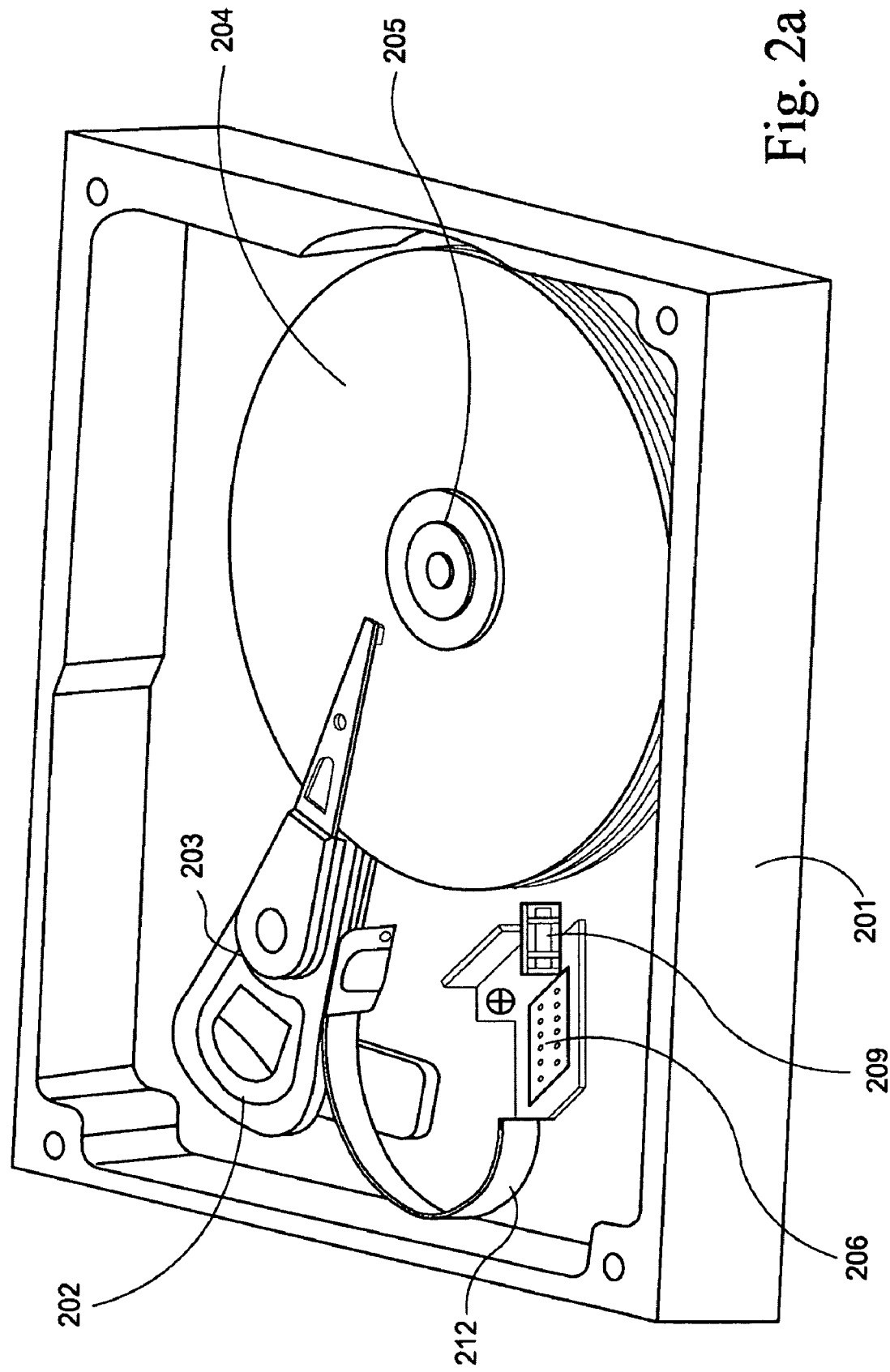
FIG. 2a illustrates a hard disk drive (HDD) device having an altitude sensor, in accordance with a first embodiment of the present invention.

Referring now more particularly to the drawings, FIG. 2a illustrates a hard disk drive device having an altitude sensor, in accordance with a first embodiment of the present invention. The HDD comprises a base 201, a head stack assembly (HSA) 203 with a flex cable 212, a VCM 202 for controlling the HSA 203, a connector 206, a stack of disks 204, and a spindle motor 205 to rotate the disks 204. The connector 206 operably connects the flex cable 212 of the HSA 203 with a printed circuit board assembly (PCBA) (not shown). An altitude sensor 209 is formed on and operably connected to connector 206 for detecting an air flow generated by rotating the disk 204 and sensing the altitude of the environment to adjust flying height of sliders embedded in the HSA 203.

Figure 2B:
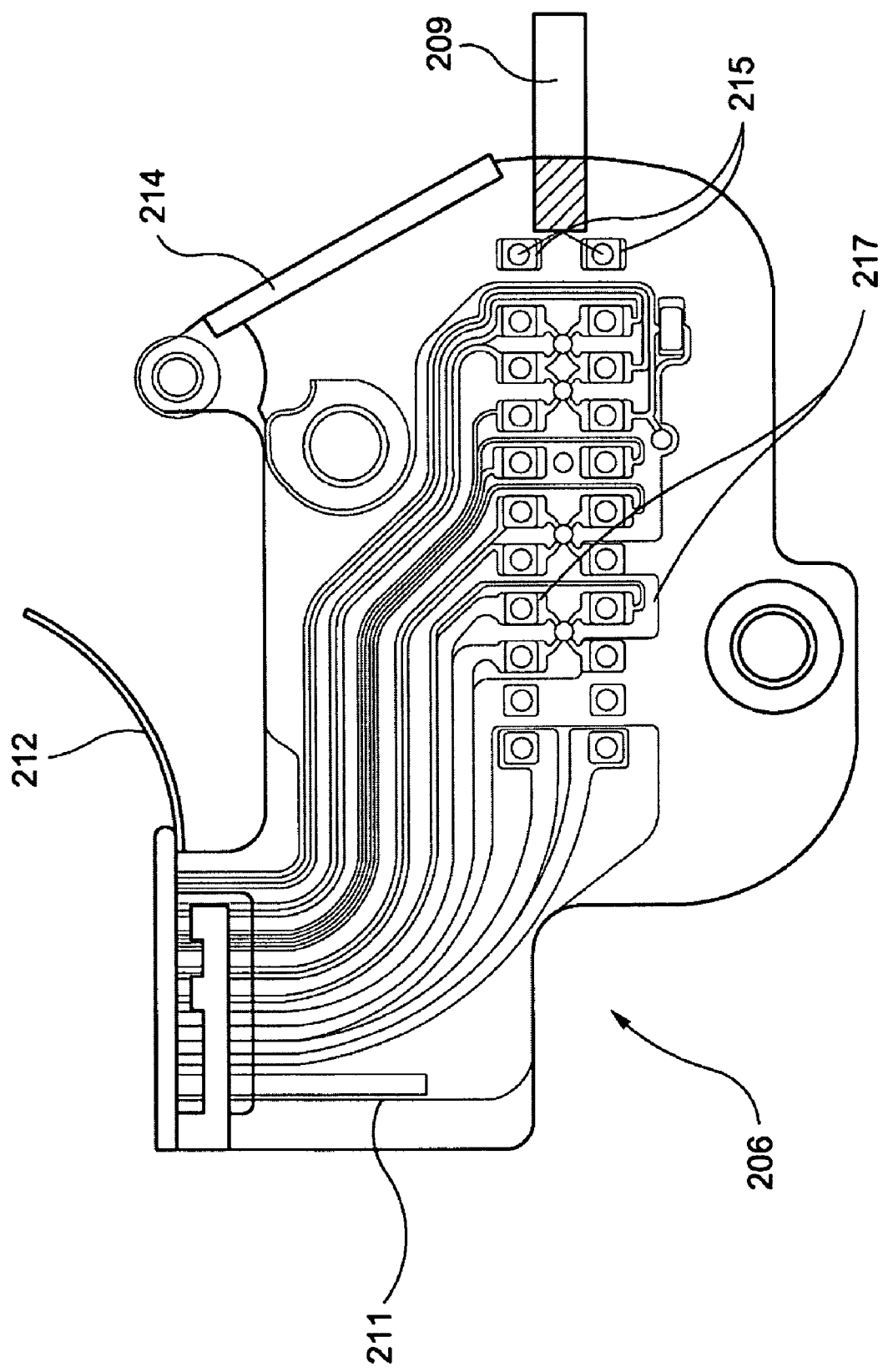
FIG. 2b is a detailed view of a connector of the hard disk drive device shown FIG. 2a, the altitude sensor being formed on the connector.

FIG. 2b is a detailed view of the connector 206 of FIG. 2a, in accordance with an example embodiment. The connector 206 comprises a connector support 211, which may be formed from a polymer, nylon, etc. The connector support 211 receives the flex cable 212, and it has a side wall 214 on or near its top edge. Multiple connector pads 217 are operably connected with traces to the flex cable 212. Specifically, the altitude sensor 209 is at least partially mounted on the edge of the connector support 211 and close to the end of the side wall 214. This arrangement is advantageous because the air flow at the side of the disk drive can be detected when the spindle motor 205 (shown in FIG. 2a) is operated. The altitude sensor 209 is operably connected with the connector pads 215. Multiple pins are soldered to the connector pads 215/217 to operably couple the connector pads 215/217 to the PCBA (not shown).

Figure 3A:
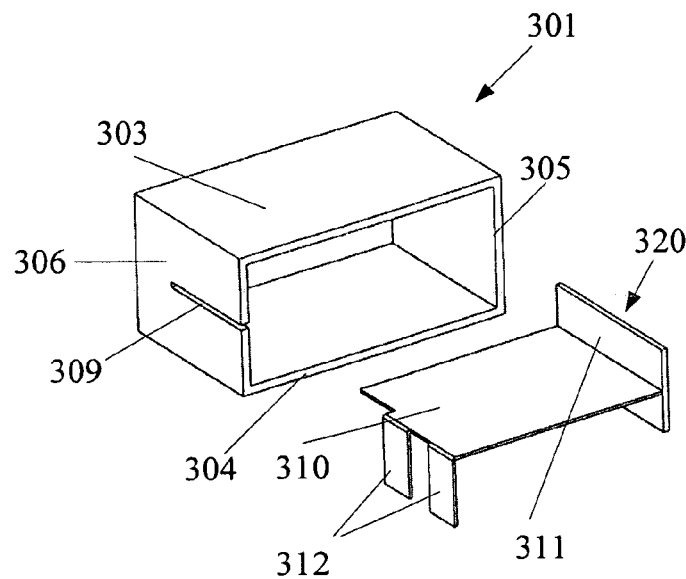
FIG. 3a is a detailed exploded view of the altitude sensor shown in FIG. 2b.

FIG. 3a is a detailed exploded view of the altitude sensor 209 shown in FIG. 2b. The altitude sensor 209 includes a support frame 301 and a sensor unit 320. The support frame 301 comprises an upper shield 303, a lower shield 304 opposite the upper shield 303 and two side shields 305, 306 respectively connecting corresponding end portions of the upper shield 303 and the lower shield 304. The side shield 306 has a notch 309 formed therein. The sensor unit 320 comprises a beam 310 and a damper 311. The damper 311 is attached to a free end of the beam 310. The damper 311 is configured to move up and down in response to the air flow and the beam 310 is configured to move up and down in response to the damper 311. According to the present invention, the beam 310 could be bonded to the damper 311 by adhesive. It will be appreciated that, alternatively, the beam 310 can also be integrally formed with the damper 311.

Figure 3B:
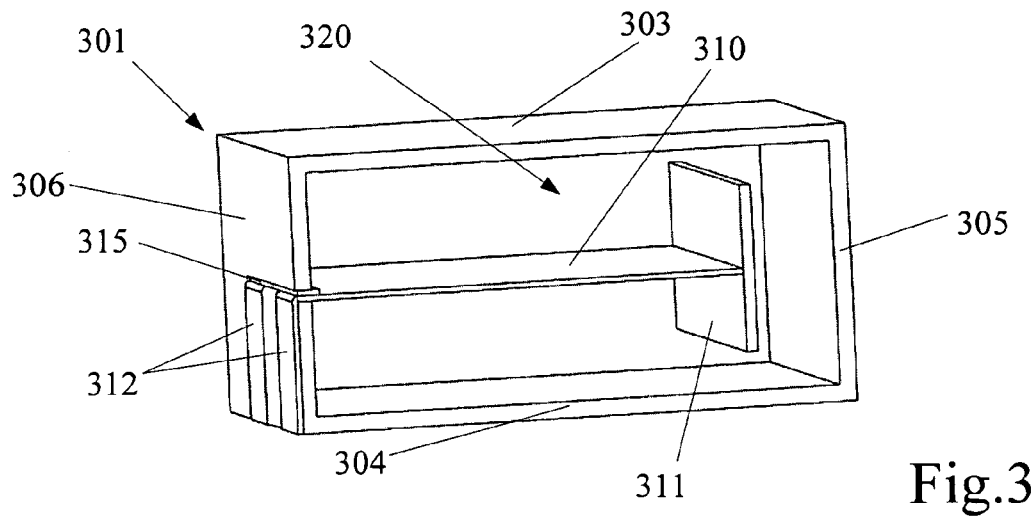
FIG. 3b is a perspective view of the altitude sensor of FIG. 3a when assembled.
Figure 3C:
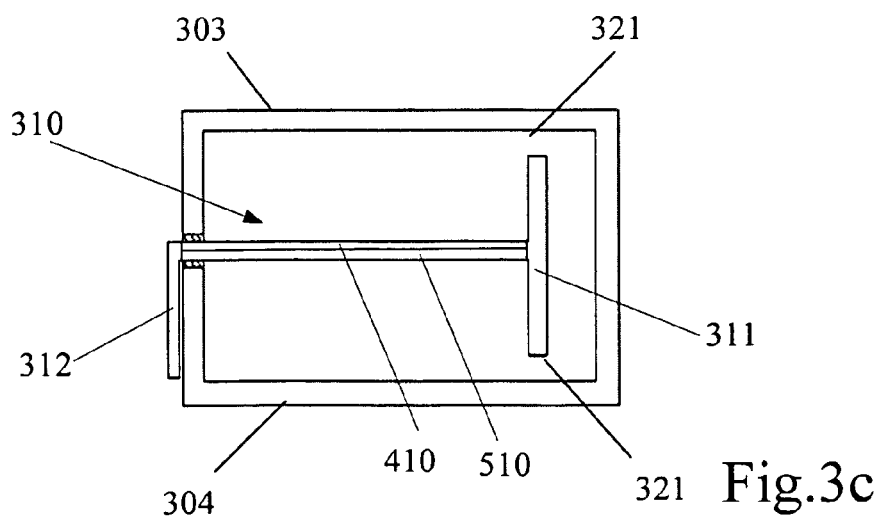
FIG. 3c is a side view of the altitude sensor of FIG. 3b.

FIG. 3b is a perspective view of the altitude sensor 209 shown in FIG. 3a when assembled and FIG. 3c is a side view of the altitude sensor 209 shown in FIG. 3b. The beam 310 further comprises a PZT layer 410 and a substrate layer 510. The PZT layer 410 is formed on the substrate layer 510. Two connection pads 312 are operably coupled to the PZT layer 410. The PZT layer 410 is configured to generate a voltage corresponding to a movement of the beam 310 and the two connection pads 312 is suitable for outputting the voltage. In the embodiment, the substrate layer 510 is formed from a ceramic (e.g. a silicon or MgO structure), a metal, etc., and the PZT layer 410 may be a ceramic PZT crystal, a thin-film PZT crystal, or the other suitable material, for example, a PMN-Pt crystal.

Also referring to FIGS. 3b-3c, one end of the beam 310 opposite the free end is inserted into the notch 309 of the side shield 306. The beam 310 is cantilevered horizontally in the support frame 301. Distances from the damper 311 to the upper shield 303 and the lower shield 304 are less than those from the beam 310 to the upper shield 303 and the lower shield 304, respectively. In that case, two spaces 321 exist between the two shields 303, 304 of the support frame 305 and ends of the damper 311. Therefore, the damper 311 works as a limiter to prevent the beam 310 from deforming too much, thus successfully protecting PZT elements on the beam 310 from damage in accident, such as during dimple and flexure interference or in case of a shock or vibration. Therefore, no fragments or particles will be generated, and thus the head-disk interface would not contaminated or impaired, thereby the head read and write functions could be soundly achieved. In fact, the altitude sensor of the present invention enhances reliability of the disk drive unit due to the capability of flying height adjustment.

The following will illustrate principle of the altitude sensor 209. The damper 311 is configured to move in response to the air flow causing by the spinning of the disk in the disk drive unit. When the disk rotates, air flow generated by the disk will excite the damper 311 of the sensor unit 320 of the altitude sensor 209 and the damper 311 will move up and down in the support frame 3301 in response to the air flow. Accordingly, the beam 310 will deform subsequently in response to the movement of the damper 311. Then, the PZT elements of the beam 310 will deform and generate a voltage in response to the deformation of the beam 310. Calibrations may be performed to compensate for altitude changes (e.g. the air inside of the disk drive will become thin and the air resistance will be reduced at higher altitudes, which may reduce its damping of the device and also cause the dominant frequency of the eddies to change as the altitude increases, all of which may affect, and be detected, by the sensor device). Also, the output sensitivity of the PZT element may change with the altitude change. After the altitude is sensed by the PZT element in the altitude sensor, the servo motor may use this signal to calculate and/or adjust the dynamic flying height (DFH) of the read/write head.

Figure 4A:
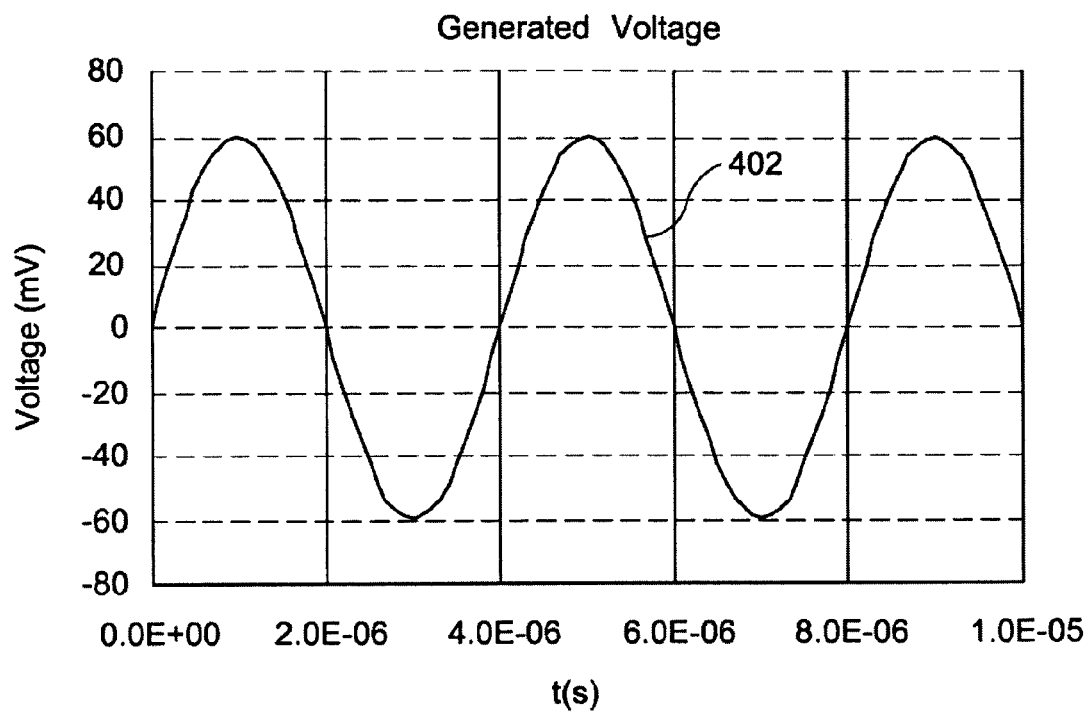
FIGS. 4a and 4b show testing data for an example embodiment.
Figure 4B:
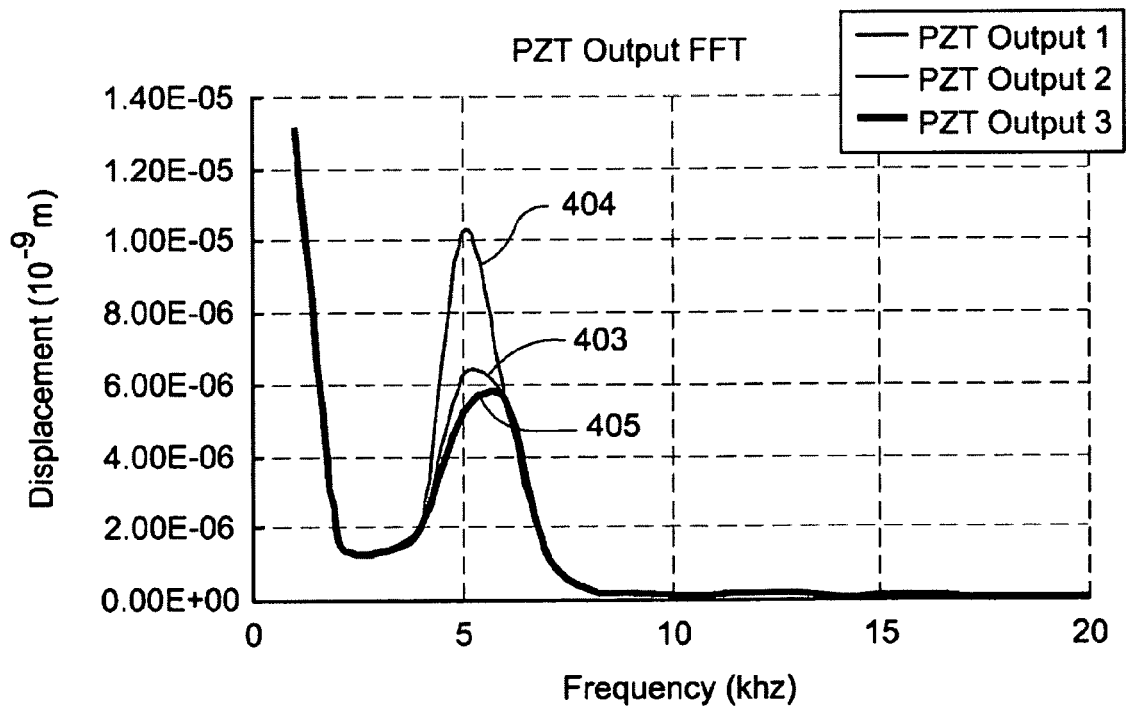

FIGS. 4a and 4b show testing data for an example embodiment. When the HDD is turned on, the altitude sensor will sense the air flow and deform. This deformation will generate a signal output 402. A Fast Fourier Transform (FFT) of the sensor output produces curves 403, 404, and 405, which relate the output and altitude information. Curve 405 corresponds to a normal altitude, curve 403 corresponds to a higher than normal altitude, and curve 404 corresponds to a yet higher altitude. It will be appreciated that other transforms in place of, or in addition to, Fast Fourier Transforms may be used in certain example embodiments.

Figure 5A:
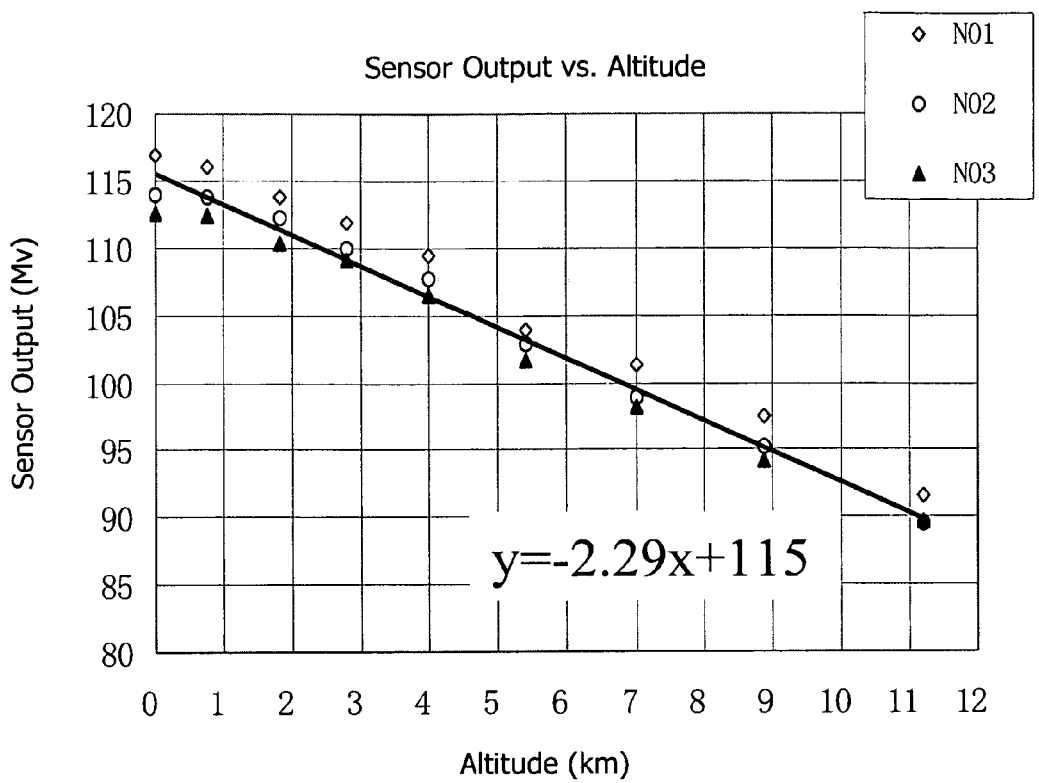
FIG. 5a plots sensor output vs. altitude for a simulation of an example embodiment.
Figure 5B:
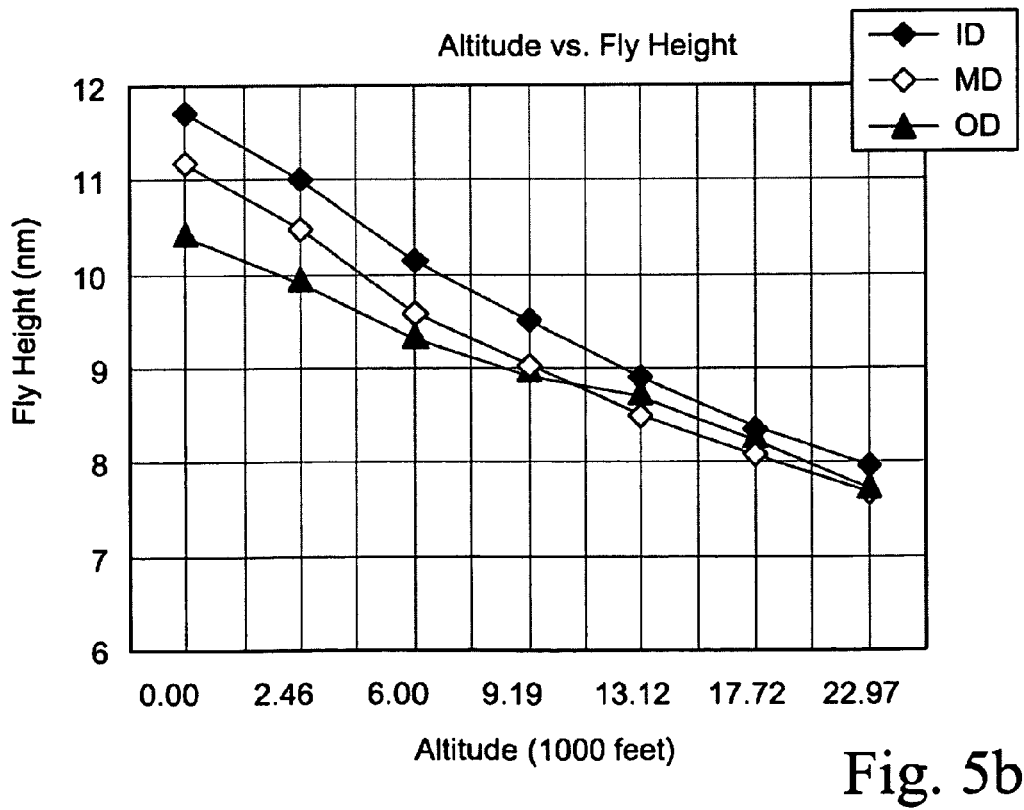
FIG. 5b plots flying height vs. altitude for another simulation of an example embodiment.

FIG. 5a plots sensor output vs. altitude for a simulation of an example embodiment showing testing data with three samples. Form the chart, it becomes apparent that the sensor output decreases substantially linearly as altitude increases. More particularly, the linear equation that is the best fit to this data is y=−2.29x+115. FIG. 5b plots head flying height vs. altitude for another simulation of an example embodiment. The ID, MD, and OD lines represent data for the head laying on the inner, middle, and outer tracks of the disks, respectively. In FIG. 5b, the chart shows the head flying height with ID, MD, and OD track changes when the altitude of the environment changes. As an example, when the altitude of the environment changes from approximately 0 to 22.97 thousand feet, the head flying height reduces approximately 3.5 nm in the MD track. The system should be compensate for or adjust. Otherwise, this change may result in damage to the head-disk interface caused by, for example, the head crashing on the disk.

Figure 6:
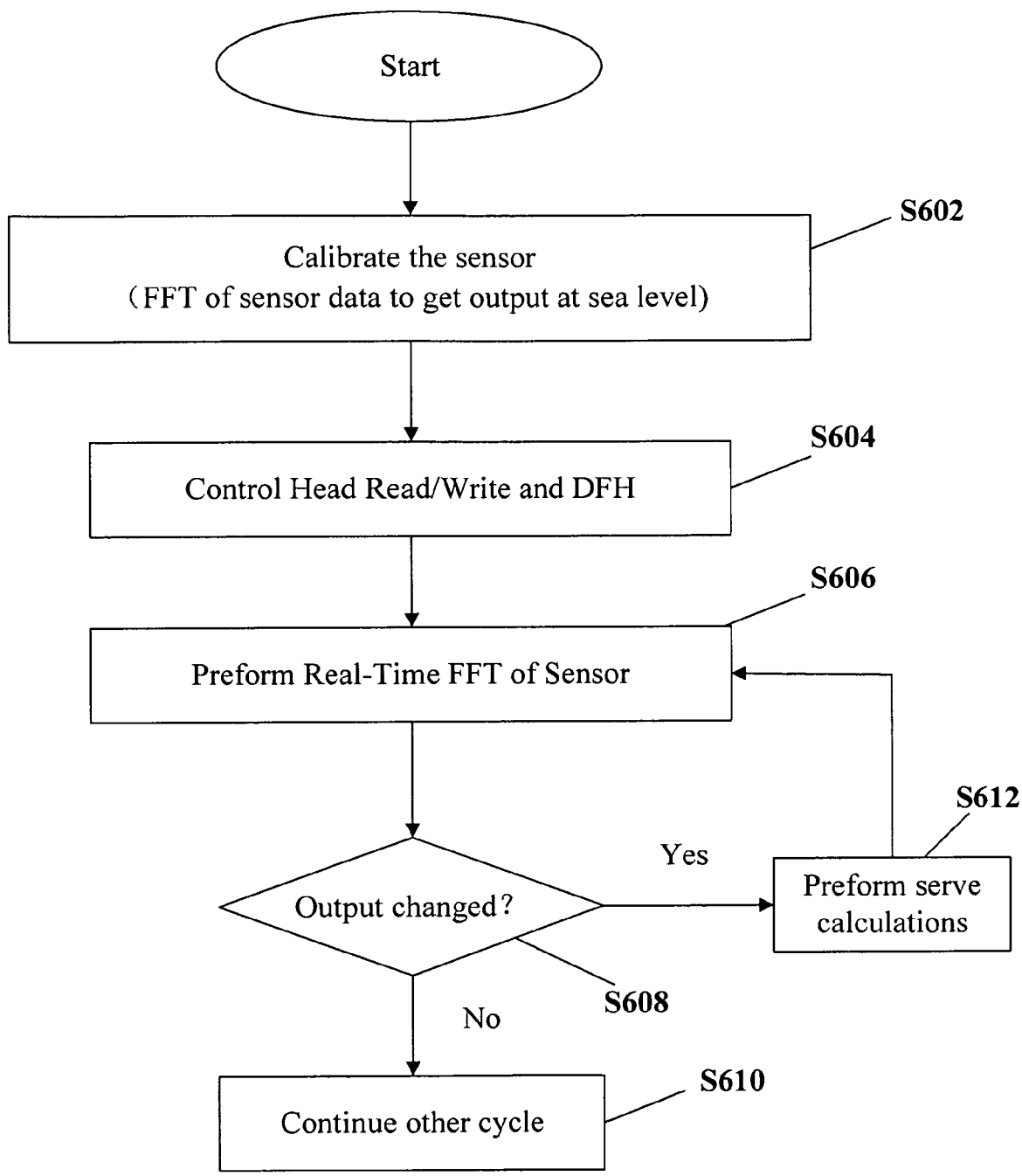
FIG. 6 is an illustrative flowchart showing a process for adjusting the head flying height using the altitude sensor, in accordance with an example embodiment.

FIG. 6 is an illustrative flowchart showing a process for adjusting the head flying height using the altitude sensor, in accordance with an example embodiment. The sensor is calibrated in step S602 by, for example, performing a FFT on the sensor data to determine the output at sea level. The head read/write process and the dynamic flying height (DFH) are controlled in step S604. In step S606, a real-time FFT is performed on sensor data. Step S608 determines whether the output has changed. If it has not changed, the cycle continues in step S610. However, if the output has changed, servo calculations are performed in step S612, and the process returns to step S604 (wherein the head read/write process and the DFH are controlled).

Figure 7A:
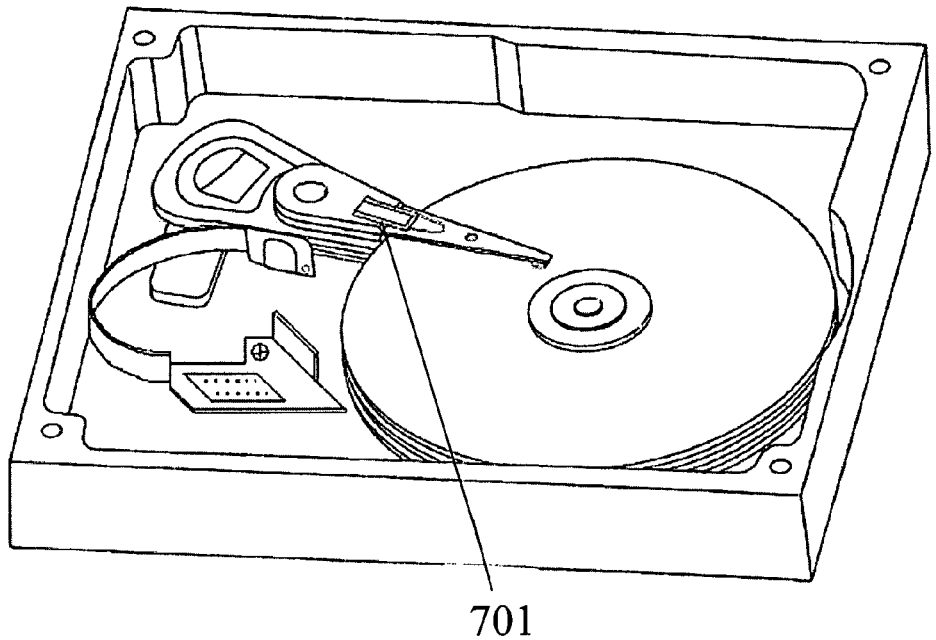
FIG. 7a illustrates a hard disk drive device having an altitude sensor, in accordance with a second embodiment of the present invention, wherein the altitude sensor is mounted to a top surface of a drive arm.
Figure 7B:
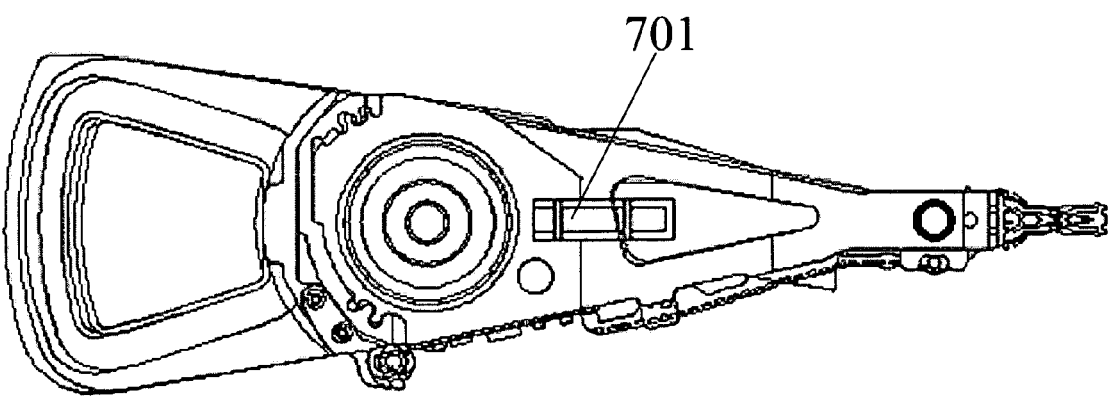

FIG. 7a illustrates a hard disk drive device having an altitude sensor 701 in accordance with a second embodiment of the present invention. FIG. 7b is a detailed view of a drive arm (or VCM arm) of the hard disk drive device of FIG. 7a. The altitude sensor 701 is mounted to a top surface of the drive arm of the hard disk drive device. The altitude sensor 701 will sense the air flow from the disk and generate signals in a manner similar to the first embodiment set forth above. Alternatively, or in addition, the altitude sensor 701 may be mounted on a top surface of each arm in the HSA.

Figure 8:
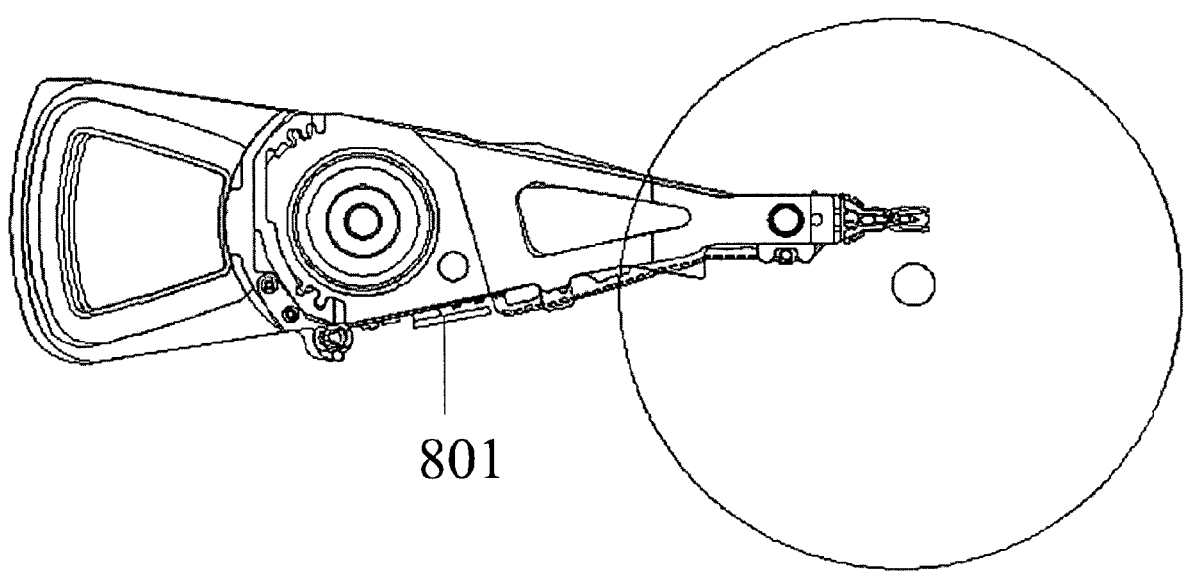
FIG. 8 illustrates a hard disk drive device having an altitude sensor, in accordance with a third embodiment of the present invention, wherein the altitude sensor is mounted to a side surface of a drive arm.

FIG. 8 illustrates a hard disk drive device having an altitude sensor 801, in accordance with a third embodiment of the present invention. The altitude sensor 801 is mounted to a side surface of a drive arm (or the VCM arm) of the hard disk drive device. In particular, the altitude sensor 801 is on the side of the drive arm proximate to a pre-amplifier. A trace (not shown) from the flex cable may be used for operably connecting the altitude sensor 801 to a servo controller.

Figure 9:
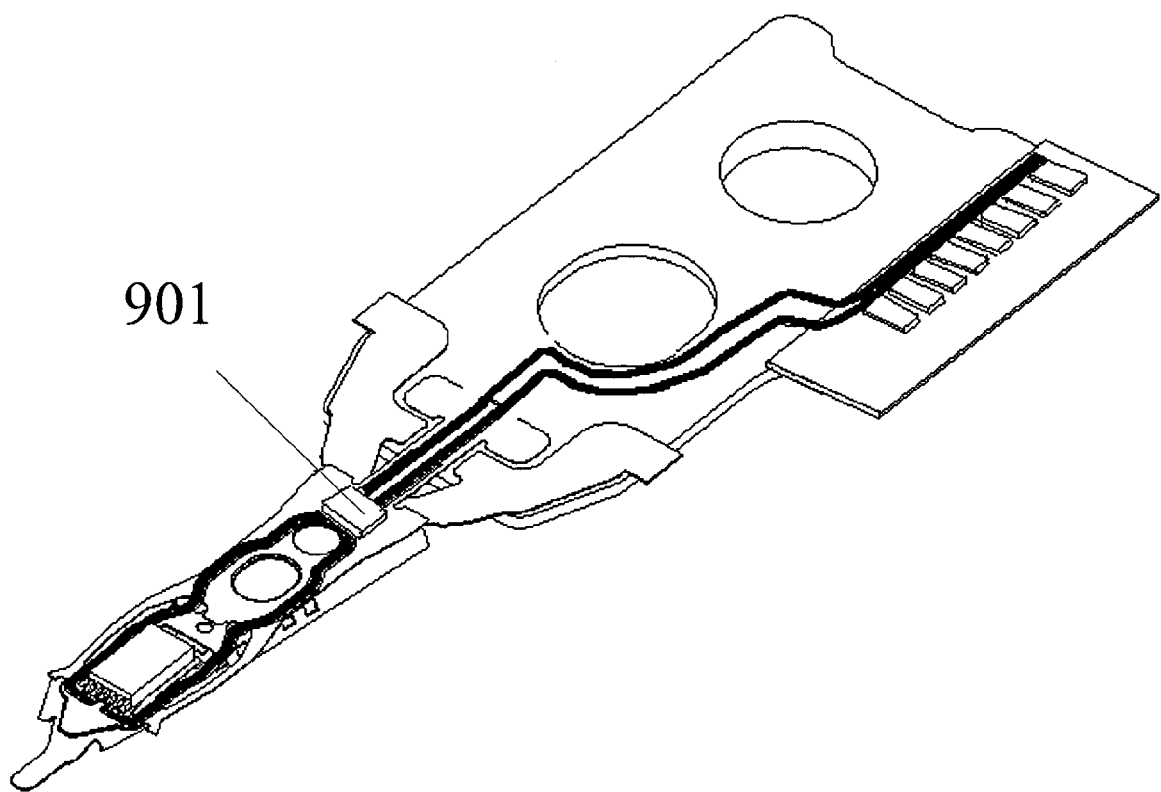
FIG. 9 illustrates a hard disk drive device having an altitude sensor, in accordance with a fourth embodiment of the present invention, wherein the altitude sensor is located on a middle region of traces of a head gimbal assembly of the hard disk drive device.

FIG. 9 illustrates a hard disk drive device having an altitude sensor 901, in accordance with a fourth embodiment of the present invention. The altitude sensor 901 is located on a middle region of traces of a head gimbal assembly of the hard disk drive device. A multiple trace for electrical connection may be directly and parallely laminated with the read/write trace, which may increase output sensitivity of the altitude sensor 901 since it is more close to the disk.

Figure 10:
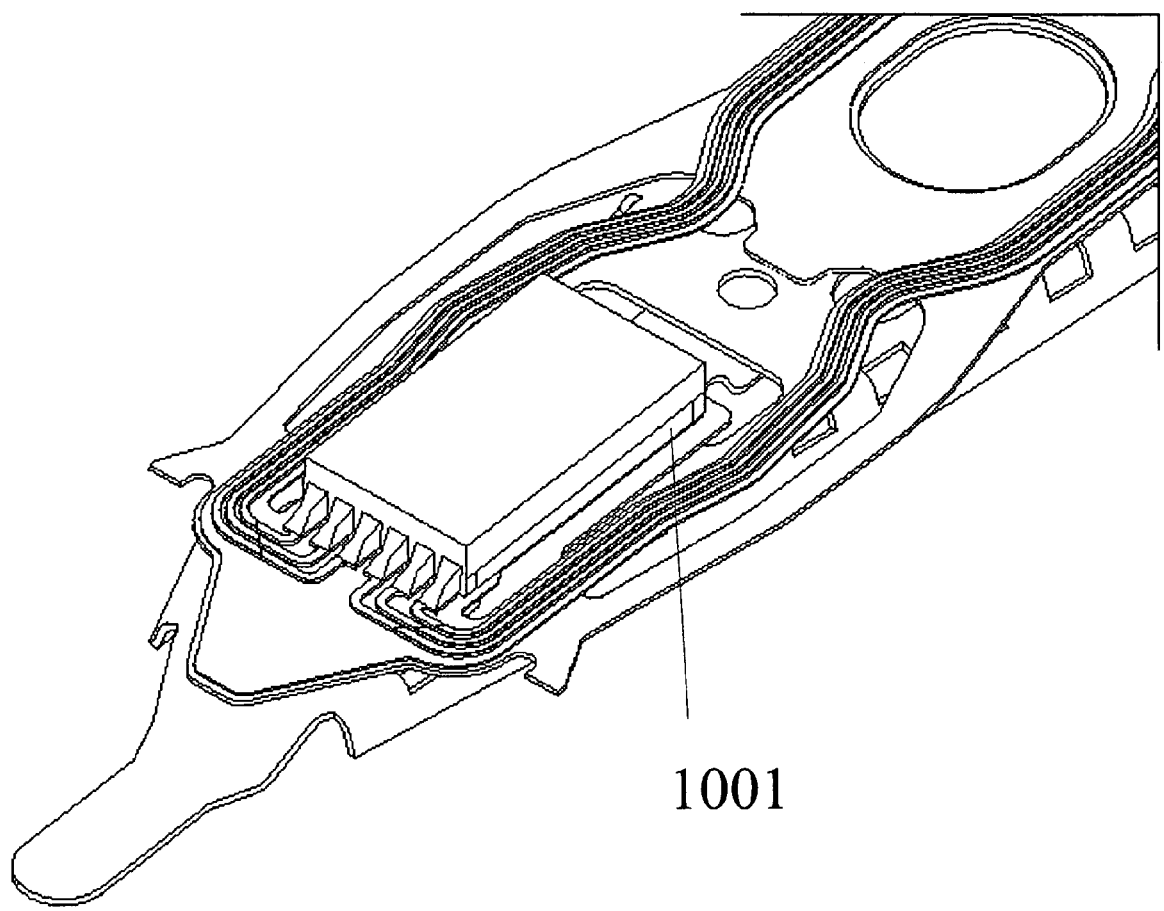
FIG. 10 illustrates a hard disk drive device having an altitude sensor, in accordance with a fifth embodiment of the present invention, wherein the altitude sensor is located under the slider.

FIG. 10 illustrates a hard disk drive device having an altitude sensor 1001, in accordance with a fifth embodiment of the present invention. The altitude sensor 1001 is located under a slider. When loading head gimbal assembly with the altitude sensor 1001, the slide will fly on a disk of the hard disk drive device and the altitude sensor 1001 will sense air flow and generate corresponding output. Such arrangement may also increase output sensitivity of the altitude sensor 1001.

Figure 11:
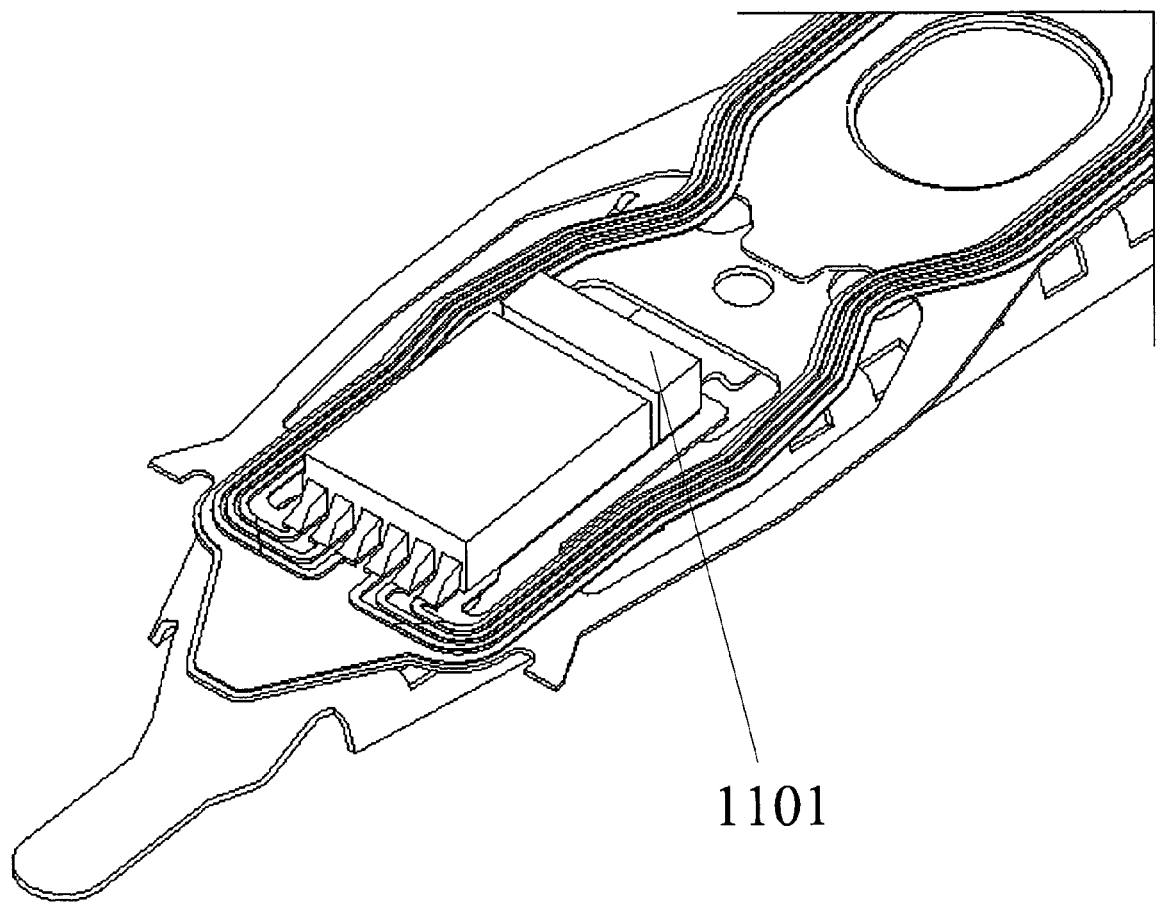
FIG. 11 illustrates a hard disk drive device having an altitude sensor, in accordance with a sixth embodiment of the present invention, wherein the altitude sensor is located near a leading edge of the slider.

FIG. 11 illustrates a hard disk drive device having an altitude sensor 1101, in accordance with a sixth embodiment of the present invention. The altitude sensor 1101 is located near a leading edge of a slider. Such arrangement may also increase output sensitivity of the altitude sensor 1101.

It will be appreciated that the above simulations and experiments are given by way of example and without limitation. Other data from other simulations and/or experiments may yield different results potentially affecting, for example, the best fit equation (e.g. in terms of coefficients, linearity, etc.), heights at which problems may be expected, etc. Indeed, other experiments may yield data and/or best fit equations better suited for the example embodiments described with reference to FIGS. 7-11.

Although certain example embodiments have been described as relating to altitude sensors that may be disposed within disk drive devices, the present invention is not so limited. For example, certain example embodiments may provide an altitude sensor for use in any device and/or system for any industry or field in which it is desirable to sense windage and/or to define the related altitude and/or altitude changes. In certain of such example embodiments, the altitude sensor may be located proximate to the windage region, and/or at the edge of a side wall that may direct the air flow of the windage towards the sensor.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. An altitude sensor configured to detect an air flow generated by a component of a system, comprising:
a support frame having an upper shield and a lower shield opposite the upper shield;
a sensor unit mounted in the support frame, the sensor unit comprising:
a beam cantilevered horizontally in the support frame;
a damper attached to a free end of the beam and configured to move up and down in response to the air flow, which drives the beam to move up and down accordingly;
at least one PZT layer formed on a surface of the beam, the at least one PZT layer being configured to generate a voltage corresponding to a movement of the beam; and
at least one connection pad operably coupled to the at least one PZT layer, the at least one connection pad being suitable for outputting the voltage;
wherein distances from the damper to the upper shield and the lower shield are less than those from the beam to the upper shield and the lower shield, respectively;
wherein the air flow is related to altitude,
wherein the support frame further comprises two side shields, the two side shields respectively connect corresponding end portions of the upper shield and the lower shield, one of the two side shields has a notch formed therein, and an end of the beam opposite the free end is inserted into he notch.

2. The altitude sensor of claim 1, wherein the damper is bonded to the beam by adhesive.

3. The altitude sensor of claim 1, wherein the beam is integrally formed with the damper.

4. The altitude sensor of claim 1, wherein the beam comprises a substrate layer formed from a ceramic and/or a metal, and the at least one PZT layer is formed on the substrate layer.

5. An altitude sensor for use in a disk drive device, comprising:
a support frame having an upper shield and a lower shield opposite the upper shield;
a sensor unit mounted in the support frame, the sensor unit comprising:
a beam cantilevered horizontally in the support frame;
a damper attached to a free end of the beam and configured to move up and down in response to an air flow generated by a rotating disk, which drives the beam to move up and down accordingly;
at least one PZT layer formed on a surface of the beam, the at least one PZT layer being configured to generate a voltage corresponding to a movement of the beam; and
at least one connection pad operably coupled to the at least one PZT layer, the at least one connection pad being suitable for outputting the voltage;
wherein distances from the damper to the upper shield and the lower shield are less than those from the beam to the upper shield and the lower shield, respectively.

6. The altitude sensor of claim 5, wherein the support frame further comprises two side shields, the two side shields respectively connect corresponding end portions of the upper shield and the lower shield, one of the two side shields has a notch formed therein, and an end of the beam opposite the free end is inserted into the notch.

7. The altitude sensor of claim 5, wherein the damper is bonded to the beam by adhesive.

8. The altitude sensor of claim 5, wherein the beam is integrally formed with the damper.

9. The altitude sensor of claim 5, wherein the beam comprises a substrate layer formed from a ceramic and/or a metal, and the at least one PZT layer is formed on the substrate layer.

10. A disk drive device, comprising:
a head gimbal assembly, the head gimbal assembly including a slider formed thereon;
a drive arm connected to the head gimbal assembly;
a disk, the disk causing an air flow when spun;
a spindle motor operable to spin the disk; and,
an altitude sensor for adjusting flying height of the slider, the altitude sensor including:
a support frame having an upper shield and a lower shield opposite the upper shield;
a sensor unit mounted in the support frame, the sensor unit comprising:
a beam cantilevered horizontally in the support frame;
a damper attached to a free end of the beam and configured to move up and down in response to the air flow, which drives the beam to move up and down accordingly;

at least one PZT layer formed on a surface of the beam, the at least one PZT layer being configured to generate a voltage corresponding to a movement of the beam; and at least one connection pad operably coupled to the at least one PZT layer, the at least one connection pad being suitable for outputting the voltage;

wherein distances from the damper to the upper shield and the lower shield are less than those from the beam to the upper shield and the lower shield, respectively.

11. The altitude sensor of claim 10, wherein the support frame further comprises two side shields, the two side shields respectively connect corresponding end portions of the upper shield and the lower shield, one of the two side shields has a notch formed therein, and an end of the beam opposite the free end is inserted into the notch.

12. The altitude sensor of claim 10, wherein the beam is bonded to the damper by adhesive.

13. The altitude sensor of claim 10, wherein the beam is integrally formed with the damper.

14. The altitude sensor of claim 10, wherein the beam comprises a substrate layer formed from a ceramic and/or a metal, and the at least one PZT layer is formed on the substrate layer.

15. The disk drive device of claim 10, further comprising a processor configured to determine the flying height of the slider over the disk appropriate at a given altitude, a dynamic flying height of the slider over the disk, and an adjustment amount corresponding to the difference between the flying height and the dynamic flying height.

16. The disk drive device of claim 15, wherein the processor calculates the altitude according to a formula, the formula being $y = -2.29x + 115$, wherein y is the sensor output in millivolts and x is the altitude in thousands of feet.

17. The disk drive device of claim 10, wherein the altitude sensor is located proximate to the disk.

18. The disk drive device of claim 10, wherein the altitude sensor is located on a connector of the disk drive device.

19. The disk drive device of claim 10, wherein the altitude sensor is located on a top surface of the drive arm.

20. The disk drive device of claim 10, wherein the altitude sensor is located on a side surface of the drive arm.

21. The disk drive device of claim 10, wherein the altitude sensor is located on a middle region of traces of the head gimbal assembly.

22. The disk drive device of claim 10, wherein the altitude sensor is located under the slider.

23. The disk drive device of claim 10, wherein the altitude sensor is located near a leading edge of the slider.

* * * * *